(12) United States Patent
Pasquier et al.

(10) Patent No.: US 9,409,818 B2
(45) Date of Patent: Aug. 9, 2016

(54) SULFO-ALUMINOUS CLINKER WITH A LOW BELITE CONTENT

(71) Applicant: VICAT, Paris la Defense (FR)

(72) Inventors: Michel Pasquier, Lyons (FR); Laury Barnes-Davin, Voiron (FR); Pascal Meric, Bourgoin-Jallieu (FR); Guy Beauvent, Wierre Effroy (FR)

(73) Assignee: VICAT, Paris La Defense (FR)

( * ) Notice: Subject to any disclaimer, the term of this patent is extended or adjusted under 35 U.S.C. 154(b) by 0 days.

(21) Appl. No.: 14/777,279

(22) PCT Filed: Mar. 13, 2014

(86) PCT No.: PCT/FR2014/050571
§ 371 (c)(1),
(2) Date: Sep. 15, 2015

(87) PCT Pub. No.: WO2014/140488
PCT Pub. Date: Sep. 18, 2014

(65) Prior Publication Data
US 2016/0023947 A1     Jan. 28, 2016

(30) Foreign Application Priority Data
Mar. 15, 2013 (FR) .................... 13 52320

(51) Int. Cl.
| | |
|---|---|
| C04B 28/06 | (2006.01) |
| C04B 7/32 | (2006.01) |
| C04B 7/345 | (2006.01) |
| C04B 7/47 | (2006.01) |

(52) U.S. Cl.
CPC ............... *C04B 7/323* (2013.01); *C04B 7/3453* (2013.01); *C04B 7/47* (2013.01); *C04B 28/065* (2013.01); *Y02P 40/148* (2015.11)

(58) Field of Classification Search
CPC ........ C04B 28/025; C04B 28/06; C04B 7/32; C04B 7/345; C04B 7/3453; C04B 28/065; C04B 7/323; C04B 7/47; C04B 7/52; C04B 14/06; Y02P 40/148
See application file for complete search history.

(56) References Cited

U.S. PATENT DOCUMENTS

| | | | | |
|---|---|---|---|---|
| 8,568,528 B2 * | 10/2013 | Barnes-Davin | ......... | C04B 7/323 106/739 |
| 8,715,411 B2 * | 5/2014 | Martinez | ................... | C04B 7/02 106/692 |
| 2007/0266903 A1 | 11/2007 | Gartner et al. | | |
| 2010/0132590 A1 | 6/2010 | Gartner et al. | | |
| 2011/0308431 A1 * | 12/2011 | Pasquier | ................. | C04B 7/323 106/693 |
| 2013/0118384 A1 | 5/2013 | Barnes-Davin et al. | | |

FOREIGN PATENT DOCUMENTS

| | | |
|---|---|---|
| FR | 2941448 A1 | 7/2010 |
| WO | 2006/018569 A2 | 2/2006 |
| WO | 2009/122065 A2 | 5/2009 |
| WO | 2010/086555 A1 | 8/2010 |
| WO | WO 2011/158105 A1 * | 12/2011 |
| WO | 2012/010800 A1 | 1/2012 |
| WO | WO 2012/010800 A1 * | 1/2012 |
| WO | WO 2012/065976 A1 * | 5/2012 |

OTHER PUBLICATIONS

Apr. 24, 2014 Search Report issued in International Patent Application No. PCT/FR2014/050571.
Apr. 24, 2014 Written Opinion issued in International Patent Application No. PCT/FR2014/050571.
Chen, Irvin A. et al., "Understanding expansion in calcium sulfoaluminate-belite cements", Cement and Concrete Research, 2012, vol. 42, pp. 51-60.
El-Didamony, H. et al., Characteristics of cement pastes containing sulphoaluminate and belite prepared from nano-materials, Construction and Building Materials, 2013, vol. 38, pp. 14-21.
Pelletier-Chaignat, Laure et al., "Beneficial use of limestone filler with calcium sulphoaluminate cement", Construction and Building Materials, 2012, vol. 26, pp. 619-627.

* cited by examiner

*Primary Examiner* — Anthony J Green
(74) *Attorney, Agent, or Firm* — Oliff PLC

(57) ABSTRACT

The present invention relates to a new sulfo-aluminate based clinker with a low belite content, a method for preparing this clinker, as well as the use of the clinker for preparing a hydraulic binder, and later on, grout, concrete or mortar.

13 Claims, 2 Drawing Sheets

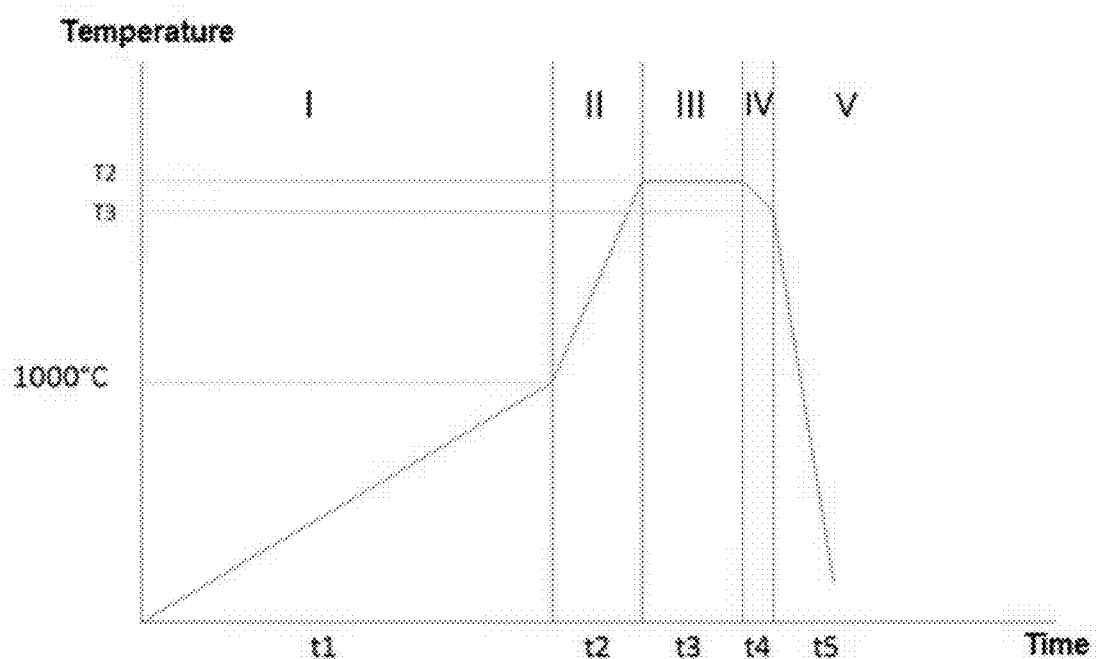
Figure 1: Baking profile

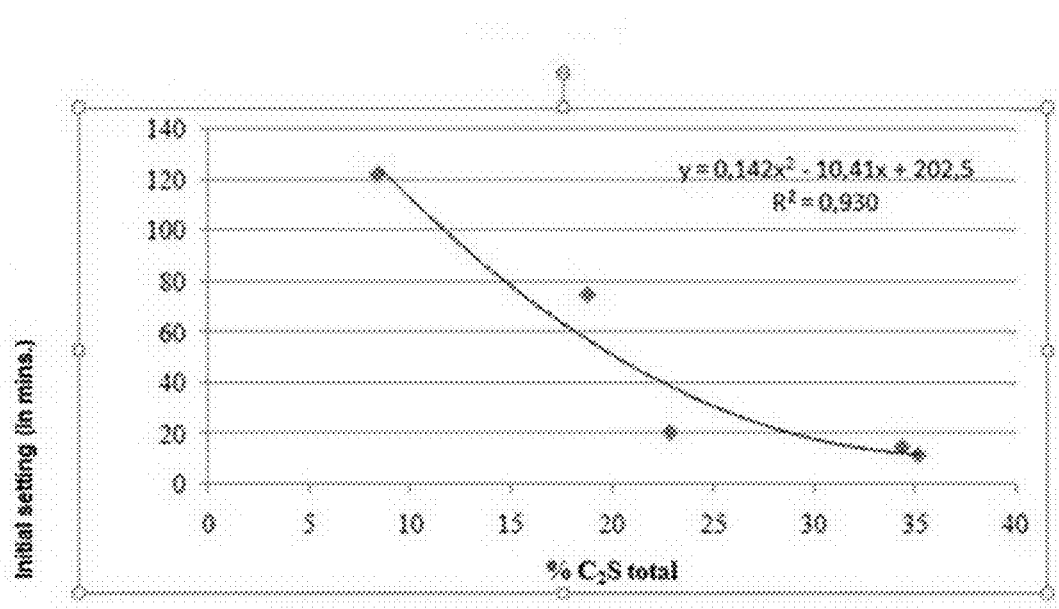
Figure 2: Correlation between the total $C_2S$ content and the initial setting time

SULFO-ALUMINOUS CLINKER WITH A LOW BELITE CONTENT

The present invention relates to a new sulfo-aluminate based clinker with a low belite content, a method for preparing this clinker, as well as the use of the clinker for preparing a hydraulic binder, and later on, grout, concrete or mortar.

BACKGROUND

The manufacture of hydraulic binders, and cements in particular, consists essentially in a calcination of a mixture of raw materials which have been judiciously selected and proportioned, also designated by the term "raw mix". Baking this raw mix gives an intermediate product, a clinker, which, when milled with possible mineral additions, produces cement. The type of cement produced depends on the nature and proportions of raw material as well as the baking method. There are distinguished several types of cements: Portland cements (which represent the greatest majority of cements produced in the world), aluminate cements (or calcium aluminate), natural quick-setting cements, sulfo-aluminate cements, sulfo-belite cements and other intermediate varieties. As these families are not entirely separate, it is preferable to describe them by their chemical and mineralogical constituents.

The most widespread cements are Portland cements. Portland cements are obtained from Portland clinker, obtained after clinkering at a temperature of the order of 1450° C. of a raw mix rich in calcium carbonate in a furnace.

The drawback of preparing such cements is that they release a lot of $CO_2$. The cement industry is hence today on the lookout for an alternative equivalent to Portland cement, that is to say, having at least the same resistance and quality features as Portland cements, but which, during their production, release less $CO_2$.

In this respect, these last few years, research has been oriented towards cements called sulfo-aluminate and sulfo-belite, which, during their production release less $CO_2$ than Portland cements.

The clinker being the result of a calcination at high temperature, the elements are essentially present in the form of oxides. Clinkers allowing the preparation of sulfo-aluminate cements or sulfo-belite cements relate to a method of producing a clinker from a raw mix constituted by a mixture comprising $CaCO_3$, $Al_2O_3$, and/or $Al(OH)_3$ $CaSO_4$, $SiO_2$, $Fe_2O_3$ compounds and/or a product containing silica or silicates such as clay, all these compounds being present in anhydrous or hydrated form, individually or in combination. The raw mix may be prepared with any natural or synthetic mineral materials able to supply calcium, silicon, sulfur, iron and aluminum.

As part of this research, numerous sulfo-aluminate clinkers have been described. It can be cited for example international patent application WO-A-2006/018569 describing sulfo-aluminate belite clinkers comprising 5 to 25% calcium aluminoferrite phase of a composition corresponding to general formula $C_2AF_{(1-x)}$, with x comprised between 0.2 et 0.8; 15 to 35% of a calcium sulphoaluminate "yee' limit" phase ($C_4A_3\$$); 40 to 75% belite ($C_2S$); and 0.01 to 10% of one or several minor phases. As mentioned in this patent application, such clinkers contain, in comparison with the alite phase ($C_3S$), the main component of Portland cements, a higher quantity of belite phase ($C_2S$), which is entirely beneficial, since it leads to reducing industrial emissions of $CO_2$ and energy consumption. However, belite contributes to the development of the long term resistance of belite sulfo-aluminate cement. Nevertheless, most clinkers described in this patent application contain boron, thus being an economic drawback as regards cost and rarity of this constituent.

As to the international patent application WO-A-2012/010800 it describes iron-doped sulfo-belite clinkers comprising from 5 to 60% iron-doped calcium sulfoaluminate phase corresponding to formula $C_4A_xF_y\$_z$ with x varying from 2 to 3, y varying from 0 to 0.5 and y being different from 0, and z varying from 0.8 to 1.2; from 0 to 25% calcium aluminoferrite phase of a composition corresponding to general formula $C_6A_{x'}F_{y'}$, with x' varying from 0 to 1.5 and y' varying from 0.5 to 3; from 20 to 70% belite $C_2S$ phase; and less than 10% $C_{11}S_4B$ phase. Iron doping is described as allowing the preparation of cements having a hydraulic reactivity and an increased resistance in comparison with clinkers described in the international patent application WO 2006/018569, while allowing to reduce $CO_2$ emissions by almost 35% during their preparation in comparison with Portland type clinkers. In addition, these clinkers do not require the presence of boron nor the addition of additives for improving the quality of the prepared cements and concretes.

The setting time of the hydraulic binders such as cement, and more generally of grout, concrete and mortar prepared from these hydraulic binders, starts from the mixture and kneading when manufacturing them. The transportation hence initiates this setting time and must be as rapid as possible in order to preserve maximum maneuverability of the grout, concrete and mortar during their placing. By way of example, the average time period for the transportation and implementation of the concrete is two hours, beyond this time period, the setting of the concrete has already started and the quality thereof is no longer ensured.

Thus, despite the setting time of the hydraulic binders prepared from clinkers described in the prior art being compliant with the applicable norms, it still remains interesting for those skilled in the art to increase said setting time as much as possible while maintaining the hydraulic reactivity and the resistance of the prepared materials in the short, medium and long term.

It therefore remains interesting to identify new clinkers able to be prepared at temperatures largely lower than 1425° C., thus strongly reducing $CO_2$ emissions during their preparation in comparison with "Portland" clinkers, which allow obtaining hydraulic binders that benefit from an improved setting time while maintaining their hydraulic reactivity and their resistance in the short, medium and long term.

In the past, numerous publications have pointed out the existence of correlation between a rapid setting time and the presence of the $C_4A_3\$$ phase in the clinker. Thus, an article called "Understanding expansion in calcium sulfoaluminate-belite cements", *Cement and Concrete Research* 42 (2012), 51-60, Chen et al. explain that sulfoaluminate-belite cements have shown a rapid setting time due to the reactivity of the $C_4A_3\$$ phase. Similarly, "Characteristics of cement pastes containing sulphoaluminate and belite prepared from nanomaterials", *Construction and building materials* 38 (2013) 14-21, El-Didamony et al. state that cements containing anhydrite have a shorter setting time and a better resistance in short deadlines.

However, it has now been found in an entirely surprising manner that the belite depletion of certain sulfo-aluminate clinkers allowed to significantly increase the setting time of the hydraulic binders prepared from these clinkers while having a hydraulic reactivity and a resistance comparable to or higher than those of cements prepared from the clinkers described in the international patent application WO-A-2012/010800, and allowing to reduce $CO_2$ emissions by almost 35% during their preparation in comparison with Portland type clinkers.

SUMMARY

The present invention hence first relates to a sulfo-aluminate clinker comprising as phase composition, with respect to the total weight of the clinker:

from 20 to 90% of a calcium sulfoaluminate phase corresponding to the formula $C_4A_xF_y\$_z$, with:
x varying from 2 to 3,
y varying from 0 to 0.5,
and z varying from 0.8 to 1.2;
from 0 to 25% of a calcium aluminoferrite phase the composition of which corresponds to the general formula $C_6A_{x'}F_{y'}$, with x' varying from 0 to 1.5 and y' varying from 0.5 to 3; and
less than 20% belite $C_2S$ phase; and
less than 2% of a $C_{11}S_4B$ phase.

The clinker according to the present invention allows for the preparation of hydraulic binders which benefit from a significantly increased setting time in comparison with the hydraulic binders that are prepared from the clinkers described in the prior art, in particular in the international patent application WO-A-2012/010800. In addition, hydraulic binders that are prepared in this manner have a hydraulic reactivity and a resistance comparable to those of the cements that are prepared from the clinkers described in the prior art, while allowing to reduce $CO_2$ emissions during their preparation by almost 35% in comparison with Portland-type clinkers.

As part of the present invention, the following notations have been adopted in order to designate the mineralogical components of cement:
C stands for CaO;
A stands for $Al_2O_3$;
F stands for $Fe_2O_3$;
S stands for $SiO_2$; and
\$ stands for $SO_3$.

Thus, for example, the calcium aluminoferrite phase, the composition of which corresponds to the general formula $C_6A_{x'}F_{y'}$, actually corresponds to a $(CaO)_6.(Al_2O_3)_{x'}.(Fe_2O_3)_{y'}$ phase.

As part of the present invention, the belite phase $C_2S$, designates the set of polymorphs constituting this phase, particularly the polymorph $C_2S_\beta$ and the polymorph $C_2S_{\alpha'high}$ ($C_2S_{\alpha'h}$).

In addition, as part of the present invention, the proportions, which are expressed in %, correspond to mass percentages with respect to the total weight of the considered entity (clinker or hydraulic binder).

BRIEF DESCRIPTION OF THE DRAWING

FIG. 1 is an illustration of a temperature profile for baking a raw mix.
FIG. 2 is a of a correlation between total $C_2S$ content and initial setting time for Example 2.

DETAILED DESCRIPTION

Preferably, an object of the present invention is a sulfo-aluminate clinker as defined previously wherein the following features are chosen separately or in combination:
the clinker contains from 30 to 80% of a calcium sulfo-aluminate phase $C_4A_xF_y\$_z$;
x varies from 2.1 to 2.9, preferably from 2.2 to 2.8;
y varies from 0.05 to 0.5, preferably from 0.1 to 0.5;
the calcium sulfo-aluminate phase contains alumina, iron and sulfur with x varying from 2.1 to 2.9, preferably from 2.2 to 2.8, y varying from 0.05 to 0.5, preferably from 0.1 to 0.5, and z varying from 0.8 to 1.2;
the clinker contains from 0 to 20% of a calcium aluminoferrite phase $C_6A_{x'}F_{y'}$;
x' varies from 0.65 to 1.3;
y' varies from 1.5 to 2.5;
the calcium aluminoferrite phase $C_6A_{x'}F_{y'}$ contains alumina and iron with x' varying from 0.65 to 1.3 and y' varying from 1.5 to 2.5; and/or
the clinker contains less than 1% of a $C_{11}S_4B$ phase, preferably even less than 0.5% of a $C_{11}S_4B$ phase. Still more preferably, the clinker is devoid of a $C_{11}S_4B$ phase.

Hence, the clinker according to the present invention contains low content belite phase ($C_2S$). Preferably, an object of the present invention is a sulfo-aluminate clinker as previously defined containing less than 19%, and preferably less than 17%, preferably even less than 15% $C_2S$ belite phase. Still more preferably, the object of the present invention is a sulfo-aluminate clinker such as defined previously containing less than 13%, preferably less than 11%, preferably even less than 9% $C_2S$ belite phase.

Preferentially, the clinkers according to the invention are totally devoid of boron added intentionally.

Other minor phases may appear in the constitution of the clinker. These minor phases may be constituted by free lime CaOl, anhydrite C\$, gehlenite $C_2AS$, mayenite $C_{12}A_7$, periclase MgO, perovskite CT, $C_3FT$, $C_4FT_2$. Preferably, the clinker according to the invention contains:
less than 3% CaOl, preferably less than 1% CaOl;
less than 5% C\$, preferably less than 2% C\$; and/or
less than 10% C2AS, preferably less than 5% C2AS.

The clinker according to the present invention should be prepared under specific conditions in order to avoid any sticking phenomenon during baking. Thus, another object of the present invention is a method for preparing a clinker as previously described, comprising the following steps:

1) preparing a raw mix from the following raw materials:
from 0.1 to 40% bauxite, marlstones, red muds and/or any other sedimentary, metamorphic or magmatic rocks or industrial mineral derivatives with a high aluminum content and a SiO2 content less than 20%;
from 0.1 to 12% gypsum, borogypsum, phosphogypsum, desulphogypsum, anhydrite and/or hemihydrate;
from 0.1 to 55% limestone and/or any other sedimentary, metamorphic or magmatic rocks or industrial mineral derivatives with a high calcium content;
from 0 to 5% quartz, silica, expanded silica, silica fumes or any other sedimentary, metamorphic or magmatic rocks or industrial mineral derivatives with high silicon content; and
from 0 to 12% iron oxide and/or iron sulfate and/or iron sulfides and/or any other natural or synthetic iron-rich and/or sulfur-rich mineral materials;

2) mixing (possibly, by co-grinding) the raw materials,
3) baking the mixture of raw materials at a temperature T2 ranging from 1150° C. to 1300° C. according to the following steps:
a) passage from ambient temperature to a temperature ranging from 800° C. to 1200° C., over a time period t1 ranging from 20 to 500 minutes,
b) raising the temperature to the desired final temperature T2, over a time period t2 ranging from 15 to 60 minutes,
c) maintaining the temperature at T2, over a time period t3 ranging from 0 to 60 minutes,
d) decreasing the temperature from T2 to T3, T3 being higher than or equal to 1100° C., over a time period t4 ranging from 0 to 15 minutes,
e) tempering the clinker and cooling it rapidly to ambient temperature, over a time period t5 ranging from 5 to 60 minutes.

For the sake of clarity, the temperature profile that is followed when proceeding to baking the raw mix, according to the method of the invention is illustrated by FIG. 1.

Preferably, the baking step of the method according to the present invention is carried out at a temperature T2 ranging from 1250° C. to 1300° C.

Preferably, the baking step of the method according to the present invention is carried out at a temperature T2, under the following conditions:

a) passage from ambient temperature to 1000° C., over a time period t1 ranging from 90 to 420 minutes,
b) raising the temperature to the desired final temperature T2, over a time period t2 ranging from 25 to 45 minutes,
c) maintaining the temperature at T2, over a time period t3 ranging from 0 to 30 minutes,
d) decreasing the temperature from T2 to 1200° C., over a time period t4 ranging from 5 to 10 minutes,
e) tempering the clinker and cooling it rapidly to ambient temperature, in 10 minutes.

The clinker according to the present invention may be prepared from different raw materials such as red muds, bauxite, limestone, marlstones, gypsum or any other source of calcium sulfate, silica, iron oxides, iron sulfate and iron sulfides, whether natural or their industrial byproducts, and any mineral material that can provide CaO, $Al_2O_3$, $Fe_2O_3$, $SiO_2$ and $SO_3$ in adequate amounts or mixtures.

The quality of baking and in particular, ensuring, in every point of an oxidizing atmosphere and maximum temperatures of 1350° C. is essential. Hence, the preparation of the clinkers according to the invention will be carried out in a furnace that allows meeting these conditions. By way of example of furnaces that are suitable for preparing the clinkers according to the present invention, mention may be made of the furnace described in the international patent application published under the number WO-A-2009/122065. The furnace that is described in this patent application is particularly suitable for preparing clinkers according to the invention since it contributes in complying with the aforementioned thermal profile.

The clinker according to the present invention may be used to prepare a hydraulic binder, for example cement, by grinding, and possibly, adding gypsum, anhydrite or hemihydrate. Hence, the present invention also relates to a hydraulic binder comprising a clinker as previously described in ground form. Preferably, the hydraulic binder according to the present invention also comprises an additional amount of gypsum, anhydrite or hemihydrate, in proportions ranging up to 25%.

The hydraulic binder according to the present invention may also comprise additives of the same type as those used for Portland cement such as, for example, limestone, natural or artificial pozzolanas, blast furnace slag, fly ashes of burning coal and silica fumes. This addition is carried out by mixing before or after grinding the constituents, by mixing powders or by co-grinding. Therefore, the binder is set as a result of the activation of the additives by the clinker. Consequently, the economy of $CO_2$ may be considerable, in comparison with a CEM I type cement (in accordance with the norm EN 197-1). Depending on the content of the additives, this economy may reach a reduction of 90% of $CO_2$ emissions.

In addition, in order to improve the mechanical performances of the hydraulic binder, it is possible to add from 1 to 10% finely-ground limestone ($CaCO_3$) (or "filler"). Adding the "filler" may be carried out by mixing before or after grinding the constituents, by mixing the powders or by co-grinding.

Finally, the present invention also relates to the different products that are prepared from the aforementioned binder, in particular grout, concrete and mortar. Thus, another object of the present invention consists of grout, concrete and mortar comprising the hydraulic binder as previously described.

The present invention may be illustrated, in a non-limiting manner, by the following examples.

Example 1

Clinkers 1 to 5

Several raw mixes have been prepared with the raw materials of which the chemical analyses are reported in mass percentages in the following tables.

TABLE 1

| Bauxite | | | | | |
|---|---|---|---|---|---|
| Elements | Bauxite 1 | Bauxite 2 | Bauxite 3 | Bauxite 4 | Bauxite 5 |
| $SiO_2$ (in %) | 21.86 | 22.13 | 14.2 | 5.73 | 5.57 |
| $Al_2O_3$ (in %) | 38.48 | 38.8 | 53.45 | 46.19 | 53.73 |
| CaO (in %) | 2.1 | 2.44 | 1.12 | 3.15 | 0.60 |
| MgO (in %) | 0.16 | 0.17 | 0.14 | 0.17 | 0.01 |
| $Fe_2O_3$ (in %) | 21.15 | 20.31 | 12.21 | 12.96 | 10.22 |
| $TiO_2$ (in %) | 1.86 | 1.85 | 3.29 | 2.74 | 2.67 |
| $K_2O$ (in %) | 0.1 | 0.1 | 0.06 | 0.07 | 0.04 |
| $Na_2O$ (in %) | 0 | 0 | 0 | 0 | 0.04 |
| $P_2O_5$ (in %) | 0.18 | 0.18 | 0.21 | 0.11 | 0.06 |
| $Mn_2O_3$ (in %) | 0.03 | 0.03 | 0.03 | 0.04 | 0.02 |
| $SO_3$ (in %) | 0.04 | 0.07 | 0.3 | 0.25 | 0.07 |
| Others (in %) | 0.02 | 0.17 | 0.03 | 0.03 | |
| Loss-on-ignition (in %) | 13.42 | 13.75 | 14.92 | 28.15 | 26.74 |
| Total | 99.40 | 100 | 99.96 | 99.59 | 99.77 |

By "loss-on-ignition", is meant the mass loss that is observed after baking at 950° C.

Bauxites 1, 2 and 3: Bauxite from the Sodicapei Villeveyrac quarries.
Bauxite 4: Bauxite from India.
Bauxite 5: Bauxite Weipa from Australia.

TABLE 2

| Limestone | | | | |
|---|---|---|---|---|
| Elements | Limestone 1 | Limestone 2 | Limestone 3 | Limestone 4 |
| $SiO_2$ (in %) | 1.42 | 1.77 | 1.55 | 1.83 |
| $Al_2O_3$ (in %) | 0.35 | 2.82 | 0.38 | 0.23 |
| CaO (in %) | 54.31 | 50.8 | 54.51 | 54.83 |
| MgO (in %) | 0.31 | 0.82 | 0.33 | 0.33 |
| $Fe_2O_3$ (in %) | 0.20 | 0.79 | 0.21 | 0.2 |
| $TiO_2$ (in %) | 0.03 | 0.18 | 0.03 | 0.02 |
| $K_2O$ (in %) | 0.08 | 0.05 | 0.04 | 0.03 |
| $Na_2O$ (in %) | 0 | 0.02 | 0 | 0 |
| $P_2O_5$ (in %) | 0.01 | 0.05 | 0.01 | 0.01 |
| $Mn_2O_3$ (in %) | 0.01 | 0.01 | 0.01 | 0.01 |
| $SO_3$ (in %) | 0.01 | 1.03 | 0.02 | 0.02 |
| Others (in %) | 0.05 | 0.03 | 0 | |
| Loss-on-ignition (in %) | 42.76 | 40.94 | 42.87 | 42.69 |
| Total | 99.54 | 99.31 | 99.96 | 100.2 |

By "loss-on-ignition", is meant the mass loss that is observed after baking at 950° C.

Limestone 1, 2, 3 and 4: Urgonian Limestone extracted in Isere.

TABLE 3

| Anhydrite and Gypsum | | | |
|---|---|---|---|
| Elements | Anhydrite | Gypsum 1 | Gypsum 2 |
| $SiO_2$ (in %) | 0.04 | 0.33 | 0 |
| $Al_2O_3$ (in %) | 0.14 | 0.31 | 0 |
| CaO (in %) | 42.19 | 31.18 | 32.81 |
| MgO (in %) | 0.16 | 0.02 | 0 |
| $Fe_2O_3$ (in %) | 0.22 | 0.27 | 0.02 |
| $TiO_2$ (in %) | 0.03 | 0.05 | 0.02 |
| $K_2O$ (in %) | 0.01 | 0.05 | 0.03 |
| $Na_2O$ (in %) | 0.02 | 0.05 | 0.14 |
| $P_2O_5$ (in %) | 0.04 | 0.41 | 0.02 |
| $Mn_2O_3$ (in %) | 0 | 0 | 0 |
| $SO_3$ (in %) | 54.75 | 43.99 | 46.29 |
| Others (in %) | 0 | 2.32 | 0.02 |
| Loss-on-ignition (in %) | 1.99 | 20.28 | 20.72 |
| Total | 99.59 | 99.26 | 100.07 |

By "loss-on-ignition", is meant the mass loss that is observed after baking at 950° C.

Anhydrite: a byproduct of the industrial production from the fluorine industry.

Gypsum 1: industrial byproduct from the production of phosphoric acid

Gypsum 2: a Merck branded laboratory product.

TABLE 4

| Silica and Iron oxides | | |
|---|---|---|
| Elements | Silica | Iron oxide |
| $SiO_2$ (in %) | 99.31 | 0 |
| $Al_2O_3$ (in %) | 0 | 0 |
| CaO (in %) | 0.1 | 0 |
| MgO (in %) | 0 | 0 |
| $Fe_2O_3$ (in %) | 0.2 | 100 |
| $TiO_2$ (in %) | 0 | 0 |
| $K_2O$ (in %) | 0.04 | 0 |
| $Na_2O$ (in %) | 0.01 | 0 |
| $P_2O_5$ (in %) | 0 | 0 |
| $Mn_2O_3$ (in %) | 0.02 | 0 |
| $SO_3$ (in %) | 0 | 0 |
| Others (in %) | 0.02 | 0 |
| Loss-on-ignition (in %) | 0.15 | 0 |
| Total | 99.85 | 100 |

By "loss-on-ignition", is meant the mass loss that is observed after baking at 950° C.

Pure silica such as Sifraco silica.

Pure Iron oxide or iron oxide from mining.

Preparation of Clinkers 1 to 5

For each clinker, an intimate mixture of the different constituents has been performed in the proportions as reported in the following table 5 (the percentage of residue on a 100 μm sieve is null)

TABLE 5

| | Bauxite | | Gypsum | | Anhydrite | Limestone | | Silica | Iron oxide |
|---|---|---|---|---|---|---|---|---|---|
| | n° | % | n° | % | (in %) | n° | % | (in %) | (in %) |
| Clinker 1 | 1 | 37.2 | — | — | 10.4 | 1 | 52.4 | — | — |
| Clinker 2 | 2 | 33.6 | 1 | 11.2 | — | 2 | 55.2 | — | — |
| Clinker 3 | 3 | 40.1 | — | — | 12.2 | 3 | 47.7 | — | — |
| Clinker 4 | 4 | 41.6 | 2 | 13.6 | — | 4 | 42.3 | 2 | 0.5 |
| Clinker 5 | 5 | 40.6 | 2 | 14.7 | — | 1 | 41.6 | — | 3.1 |

A baking in a continuous furnace such as the furnace described in the patent application WO-A-2009/122065 has been carried out at 1305° C. for 30 minutes.

The raw mix is introduced in the preheater tower and is heated by the counter-flowing gases, progressively as it descends in the tower, from ambient temperature to 1050° C. in 410 minutes.

Afterwards, the material is admitted, via an extractor, in the horizontal section of the continuous furnace, and it is conveyed to the clinkering area (1305° C.) over a time period of 30 minutes and the temperature is maintained for 30 minutes.

When exiting the clinkering area, the temperature drops to 1200° C. over a time period of 6 minutes.

Finally, the clinker is conveyed to the cooler where it undergoes a rapid tempering in order to reach ambient temperature in 10 minutes.

The "actual" chemistry of the obtained clinkers is reported in the following Table 6.

TABLE 6

| | Clinker 1 | Clinker 2 | Clinker 3 | Clinker 4 | Clinker 5 |
|---|---|---|---|---|---|
| $SiO_2$ (in %) | 12.77 | 12.09 | 8.92 | 7.51 | 4.35 |
| $Al_2O_3$ (in %) | 20.22 | 20.42 | 29.53 | 28.97 | 32.30 |
| CaO (in %) | 47.10 | 46.62 | 42.64 | 42.66 | 40.55 |
| MgO (in %) | 0.32 | 0.67 | 0.28 | 0.32 | 0.2 |
| $Fe_2O_3$ (in %) | 10.54 | 10.11 | 6.86 | 8.93 | 10.57 |
| $TiO_2$ (in %) | 1.08 | 1.13 | 2.02 | 1.9 | 1.82 |
| $K_2O$ (in %) | 0.10 | 0.11 | 0.08 | 0.08 | 0.04 |
| $Na_2O$ (in %) | 0.01 | 0.03 | 0.02 | 0.04 | 0 |
| $P_2O_5$ (in %) | 0.1 | 0.19 | 0.13 | 0.08 | 0.04 |
| $Mn_2O_3$ (in %) | 0.02 | 0.02 | 0.02 | 0.03 | 0.01 |
| $SO_3$ (in %) | 7.13 | 7.59 | 9.26 | 9.36 | 10.42 |
| Autres (in %) | 0.02 | 0.3 | 0.03 | 0 | 0.01 |
| Loss-on-ignition (in %) | 0.41 | 0.39 | 0.41 | 0.31 | 0.08 |
| Total | 99.82 | 99.67 | 100.2 | 100.19 | 100.39 |

By "loss-on-ignition", is meant the mass loss that is observed after baking at 950° C.

The crystallographic phases that are obtained for each clinker as well as their percentage are reported in the following Table 7.

TABLE 7

| | | Clinker 1 | Clinker 2 | Clinker 3 | Clinker 4 | Clinker 5 |
|---|---|---|---|---|---|---|
| $C_4A_xF_y\$_z$ | x | 2.35 | 2.27 | 2.95 | 2.56 | 2.62 |
| | y | 0.33 | 0.29 | 0.05 | 0.29 | 0.18 |
| | z | 1.09 | 1 | 1 | 1.03 | 0.98 |
| | % | 44 | 45 | 58.6 | 69.6 | 71.3 |

TABLE 7-continued

|  |  | Clinker 1 | Clinker 2 | Clinker 3 | Clinker 4 | Clinker 5 |
|---|---|---|---|---|---|---|
| $C_6A_{x'}F_{y'}$ | x' | 1 | 1 | 1 | 0 | 0.9 |
|  | y' | 2.23 | 2.37 | 2.22 | 0 | 2.1 |
|  | % | 12 | 9.8 | 1.4 | 0 | 7.7 |
| $C_2S_\beta$ (in %) |  | 30.4 | 28.9 | 13.9 | 11.2 | 8.4 |
| $C_2S_{\alpha'_h}$ (in %) |  | 4.8 | 5.5 | 9 | 7.6 | 0 |
| Other phases (in %) |  | 8.8 | 10.8 | 17.1 | 11.6 | 12.6 |

Example 2

Cements 1 to 5

Preparation of Cements 1 to 5

Clinkers 1 to 5, obtained according to the previous example 1, have been ground with 10, 10, 12, 14.5 and 15.5% anhydrite 1 so that the percentage of residue on a 100 μm sieve is null.

The cements that are thereby obtained from clinkers 1 to 5 are respectively referred to as cement 1, cement 2, cement 3, cement 4 and cement 5.

Setting Time

The initial setting time and the final setting time are assessed in accordance with the norm EN196-3 on a pure cement paste with the W/C ratio having been determined by measuring the consistency by means of the Vicat instrument.

The setting times of the cements 1 to 5 are reported in the following Table 8.

TABLE 8

|  | Cement 1 | Cement 2 | Cement 3 | Cement 4 | Cement 5 |
|---|---|---|---|---|---|
| W/C | 0.27 | 0.32 | 0.27 | 0.28 | 0.27 |
| initial setting time (in min) | 12 | 15 | 21 | 75 | 122 |
| final setting time (in min) | 27 | 40 | 49 | 147 | 219 |

The results obtained have allowed establishing the existing correlation between the total $C_2S$ content and the initial setting time (FIG. 2).

It is worth noting that the cements prepared from clinkers containing less than 20% $C_2S$ (cements 4 and 5) have a significantly extended setting time with respect to the cements prepared from clinkers which contain more than 20% $C_2S$ (cements 1 to 3).

Cement 5 has at the same time an initial setting time comparable with Portland clinker-based cements.

Mechanical Resistance

From these cements, mortar has been prepared, in accordance with the norm EN 196-1, with the following composition:
450 g cement;
1350 g standard sand;
225 g water.

The mechanical resistance of mortar is measured on 4×4×16 cm3 prismatic test specimens which have been prepared at 20° C. using metallic molds, and unmolded after 24 h. Afterwards, the test specimens are stored in water at 20° C. until the end of the measurements.

The mechanical resistance of the obtained samples is tested in accordance with the norm EN196-1.

The results of the compressive resistance (Rc) measurements are reported in the following Table 9.

TABLE 9

|  | Cement 1 | Cement 2 | Cement 3 | Cement 4 | Cement 5 |
|---|---|---|---|---|---|
| Rc 2 jours | 29 | 32.6 | 49.7 | 41.7 | 59.1 |
| Rc 7 jours | 33.7 | 42.1 | 63.1 | 57.4 | 68.2 |
| Rc 28 jours | 37.5 | 42.4 | 63.7 | 61.5 | 69.7 |

It appears that the cements prepared from a clinker containing low $C_2S$ content (cements 3, 4 and 5) have a better mechanical resistance than cements prepared from clinker containing more important $C_2S$ content (cements 1 and 2).

The invention claimed is:

1. A sulfo-aluminate based clinker, having a phase composition, with respect to the total weight of the clinker, comprising:
   from 20 to 90% of an iron-doped calcium sulfo-aluminate phase corresponding to the formula represented by $C_4A_xF_y\$_z$, with:
      x varying from 2.1 to 2.9,
      y varying from 0.05 to 0.5,
      and z varying from 0.8 to 1.2;
   from 0 to 25% calcium aluminoferrite phase corresponding to a general formula represented by $C_6A_{x'}F_{y'}$, with x' varying from 0 to 1.5 and y' varying from 0.5 to 3; and
   less than 20% belite $C_2S$ phase; and
   less than 1% $C_{11}S_4B$ phase;
   wherein:
   C represents CaO;
   A represents $Al_2O_3$;
   F represents $Fe_2O_3$;
   S represents $SiO_2$; and
   $ represents $SO_3$.

2. The clinker according to claim 1, wherein the phase composition contains from 30 to 80% of the iron-doped calcium sulfo-aluminate phase $C_4A_xF_y\$_z$.

3. The clinker according to claim 1, wherein the phase composition contains from 0 to 20% of the calcium aluminoferrite phase $C_6A_{x'}F_{y'}$.

4. The clinker according to claim 1, wherein x' varies from 0.65 to 1.3 and/or y' varies from 1.5 to 2.5.

5. The clinker according to claim 1, wherein the phase composition contains less than 15% of the $C_2S$ belite phase.

6. The clinker according to claim 1, wherein the phase composition contains less than 3% of free lime CaOl.

7. The clinker according to claim 1, wherein the phase composition contains less than 5% of C$ phase.

8. The clinker according to claim 1, wherein the phase composition contains less than 10% of $C_2AS$ phase.

9. A method for preparing a clinker according to claim 1 comprising the following steps:
   1) preparing a raw mix of raw materials comprising:
      from 0.1 to 40% bauxite, marlstones, or red muds;
      from 0.1 to 12% gypsum, borogypsum, phosphogypsum, desulphogypsum, anhydrite and/or hemihydrate;
      from 0.1 to 55% limestone;
      from 0 to 5% quartz, silica, expanded silica, or silica fumes; and
      from 0 to 12% iron oxide and/or iron sulfate and/or iron sulfides and/or any other natural or synthetic iron-rich and/or sulfur-rich mineral materials;
   2) mixing (optionally, by co-grinding) the raw materials; and
   3) baking the mixture of raw materials at a temperature T2 ranging from 1150° C. to 1300° C. according to the following steps:

a) heating the mixture from ambient temperature to a temperature ranging from 800° C. to 1200° C. over a time period t1 ranging from 20 to 500 minutes,
b) raising the temperature to the temperature T2, over a time period t2 ranging from 15 to 60 minutes,
c) maintaining the temperature T2, over a time period t3 ranging from 0 to 60 minutes,
d) decreasing the temperature from T2 to a temperature of T3, T3 being higher than or equal to 1100° C., over a time period t4 ranging from 0 to 15 minutes,
e) tempering the clinker and cooling it rapidly down to ambient temperature, over a time period t5 ranging from 5 to 60 minutes.

10. A hydraulic binder comprising the clinker according to claim 1.

11. Grout comprising the hydraulic binder according to claim 10.

12. Concrete comprising the hydraulic binder according to claim 10.

13. Mortar comprising the hydraulic binder according to claim 10.

* * * * *